Sept. 4, 1956 D. W. VAN DOORN ET AL 2,761,178

OPERATING MECHANISM FOR GIN BREASTS AND MULTIPLE GIN SYSTEM

Filed Feb. 2, 1952 7 Sheets-Sheet 1

INVENTORS.
DONALD W. VAN DOORN
WILLIAM C. PEASE III
BY Jennings & Carter
ATTORNEYS INVENTORS.
DONALD W. VAN DOORN
WILLIAM C. PEASE III
BY
Jennings & Carter
ATTORNEYS INVENTORS.
DONALD W. VAN DOORN
WILLIAM C. PEASE III
BY Jennings & Carter
ATTORNEYS INVENTORS.
DONALD W. VAN DOORN
WILLIAM C. PEASE III
BY Jennings & Carter
ATTORNEYS Sept. 4, 1956 D. W. VAN DOORN ET AL 2,761,178

OPERATING MECHANISM FOR GIN BREASTS AND MULTIPLE GIN SYSTEM

Filed Feb. 2, 1952 7 Sheets-Sheet 5

INVENTORS.
DONALD W. VAN DOORN
WILLIAM C. PEASE III
BY Jennings & Carter
ATTORNEYS Sept. 4, 1956 D. W. VAN DOORN ET AL 2,761,178

OPERATING MECHANISM FOR GIN BREASTS AND MULTIPLE GIN SYSTEM

Filed Feb. 2, 1952 7 Sheets-Sheet 6

INVENTORS.
DONALD W. VAN DOORN
WILLIAM C. PEASE III
BY

Jennings & Carter
ATTORNEYS

OPERATING MECHANISM FOR GIN BREASTS AND MULTIPLE GIN SYSTEM

Filed Feb. 2, 1952

INVENTORS.
DONALD W VAN DOORN
WILLIAM C. PEASE III
BY
Jennings & Carter
ATTORNEYS United States Patent Office
2,761,178
Patented Sept. 4, 1956

2,761,178

OPERATING MECHANISM FOR GIN BREASTS AND MULTIPLE GIN SYSTEM

Donald W. Van Doorn and William C. Pease III, Columbus, Ga., assignors to Lummus Cotton Gin Company, a corporation of Georgia Application February 2, 1952, Serial No. 269,632

20 Claims. (Cl. 19—48)

This invention relates to mechanism for moving the breasts of cotton gins to and from ginning position and to a multiple gin system in which each gin thereof embodies said mechanism, together with a control means for actuating said mechanism.

In the ginning of cotton it is customary to include a plurality of gins in each system. The gins are equipped with breasts which carry the ginning and hulling ribs and which are mounted to move into and out of ginning position relative to the saw cylinder. During ginning it is often necessary to open an individual gin breast to clean out the roll, to unchoke the gin, or for other purposes. In case of fire in the gin it is imperative that the breasts be opened quickly to stop the flow of lint so that the fire can be extinguished. In multiple gin systems it is necessary to open all of the gin breasts thereby to stop all flow of lint immediately that fire is detected anywhere in the system to prevent spreading of the fire.

It is known that a better sample of lint is obtained from a multiple gin system when all the gins thereof are ginning simultaneously. In systems wherein the gins are provided with individual, manually controlled means to throw the breasts in or out it is found that the sample ginned at the beginning and end of each bale is of poorer appearance than that ginned during the intermediate period. This is brought about, as stated, by the fact that at the beginning of ginning a bale the breasts are thrown in one by one and at the completion of the bale the breasts are thrown out one by one. Such action results in "plating" the bale on its outer surfaces with lint of poor sample, whereas the lint inside the bale is of better sample. Therefore, when the cotton is sampled for quality, which is done by taking a sample from the surface of the bale, the grade of lint by which the bale is valued is lower than the actual quality of the majority of lint in the bale.

In view of the foregoing it is an object of our invention to provide a multiple gin system in which each gin is equipped with power actuated mechanism for moving the breast thereof into and out of ginning position together with common control means for actuating all or a major number of said mechanisms simultaneously, thereby to throw all or most of the breasts in or out simultaneously.

Another object is to provide apparatus of the character designated in which each gin is individually equipped with control means for actuating the breast moving mechanism, which control means is independent of the common control means, permitting each breast to be moved independently of the others if desired.

Another object is to provide a power actuated device to be used in combination with automatic control devices and safety devices to provide means for automatically opening and closing the gin breasts as the supply of cotton to the gin stops and starts, and automatically to open the breasts in case of fire, choke, or machinery failure.

Another object is to provide mechanism for operating gin breasts which embodies a continuously rotating shaft connected to rotate lug members in opposite directions, together with electrically actuated dogs selectively engageable with the lugs, whereby upon engaging one of said dogs with its lug the breast moves into ginning position and upon engaging the other with its dog, the breast moves out of ginning position.

Another object is to provide apparatus embodying the lug and dog arrangement just mentioned in which there is provided mechanical means for disengaging the dogs from their lugs after the breast has moved to the selected position, and in which the control circuits have incorporated therein a switch effective to render inoperative the circuits for closing the breast unless the breast is open, or to render inoperative the circuits for opening the breast unless the breast is closed.

A more specific object is to provide apparatus of the character designated in which the breast operating mechanism embodies a continuously driven bevel gear in mesh with a pair of other bevel gears mounted for rotation about a shaft suitably connected to the breast through linkage, the pair of bevel gears each carrying one of the lugs mentioned above, together with means mounting the dogs for selective engagement with the lugs so that the breast operating shaft may be rocked in opposite directions to open or close the breast.

A further object is to provide power driven, electrically controlled apparatus for opening and closing a gin breast which shall embody a pair of solenoid actuated clutches having driving members rotating in opposite directions about a shaft and to which the gin breast is operatively connected, and in which the clutches are automatically disengaged after predetermined rotation of the shaft, so that once the selected one of the clutches is engaged the breast automatically moves to fully open or fully closed position, thereby permitting the driving member to be rotated continuously, simplifying the drive of the apparatus.

Further objects are to provide mechanism of the character indicated adapted for association with the breasts of existing cotton gins and which may be installed on gins without disturbing the existing manually operated means for shifting the breast; to provide such mechanism which shall be simple of construction and inexpensive of manufacture; and to provide a ginning system embodying the improved breast operating mechanism herein to be disclosed in combination with several types of switches associated with the gin, feeder, or other part thereof, which switches shall be automatically responsive to such conditions as fire, speed of rotation of certain parts of the machinery, choking of the gin and similar conditions, whereby the gin breasts open automatically upon the happening of the contingency to which the switch is responsive.

Apparatus illustrating the features of our invention is shown in the accompanying drawings forming a part of this application in which.

Figure 1:
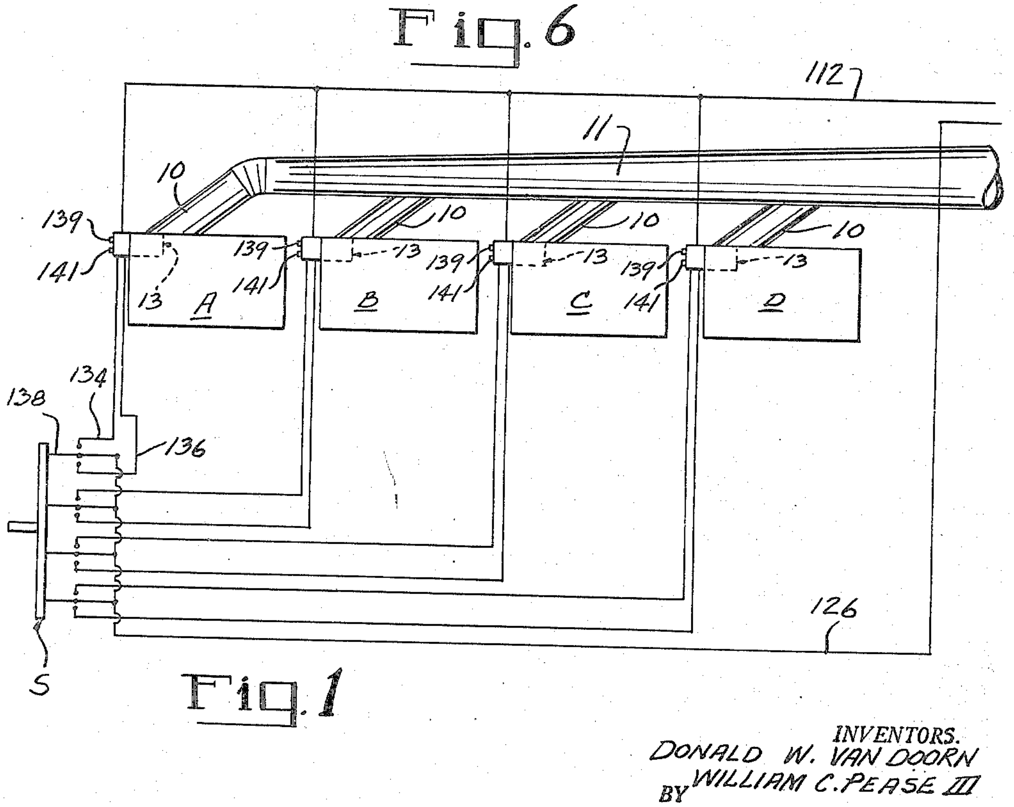
Fig. 1 is a wholly diagrammatic view illustrating a portion of a multiple gin system having our improved gin breast mechanism associated with each gin together with a common control switch for actuating said mechanisms.
Figure 2:
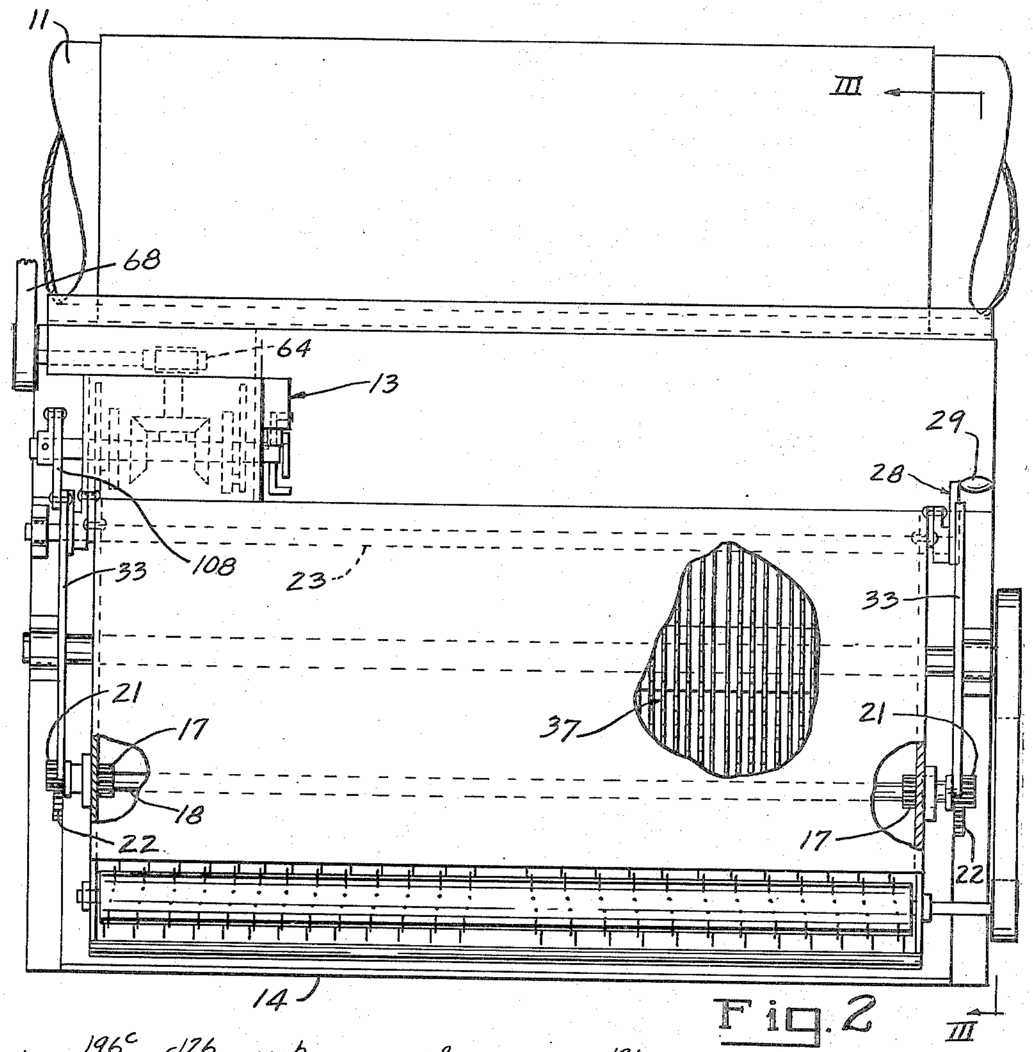
Fig. 2 is a plan view of a gin having our apparatus installed thereon, the view being partly broken away for the sake of clarity.

Referring now to the drawings for a better understanding of our invention, and more particularly to Fig. 1, we show in wholly diagrammatic manner a ginning system embodying four gins A, B, C and D. As will be understood, from the rear of each gin leads a branch lint flue 10 and each flue 10 connects with a common lint flue 11 which leads to a condenser or the like, not shown in Fig. 1. As shown diagrammatically in Fig. 1, each gin is equipped with our improved breast operating apparatus indicated generally by the numeral 13, the details of which will be described later. Likewise, and as will later appear, there is provided a common or master switch S which may be used to control simultaneously all of the mechanisms 13, thereby to open or close all of the breasts of the gins A through D, inclusive, simultaneously.

Each gin is provided with a breast indicated generally by the numeral 14. The lower end of the breast, at each end, carries a rack 16. The racks 16 rest on pinions 17 and the pinions are supported on a cross shaft 18 which projects through slots 19 in the end frames of the gin. On the outer ends of the shaft 18 are other pinions 21 in mesh with racks 22 formed on the ends of the gin framework.

Near the upper end of the breast is a cross shaft 23 journalled in suitable manner in the legs or end frames of the gin stand. At each end the shaft 23 is provided with arms 24, made fast at one end to the shaft. Pivotally connected to the outer or upper ends of the arms 24 are links 26 in turn pivotally connected as at 27 to the edge of the breast 14. Fast on the shaft 23 is a manually operable lever 28 having a handle 29. The lever 28 carries a bracket 31 to which is pivotally connected as at 32 a downwardly extending link 33. The link 33 is connected at 34 to an eccentrically disposed lug 36 made fast on the shaft 18.

Figure 6:
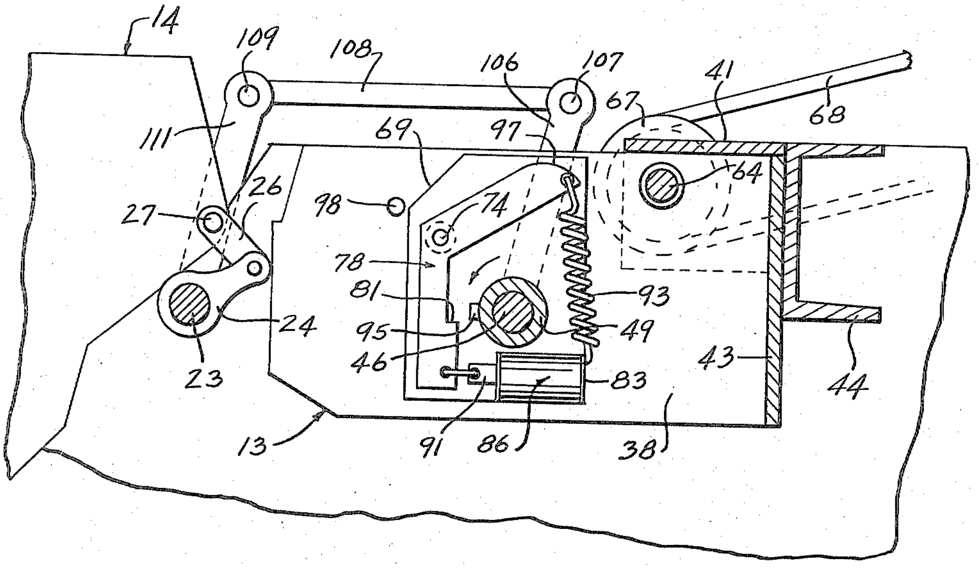
Fig. 6 is a detail sectional view taken generally along line VI—VI of Fig. 5.
Figure 3:
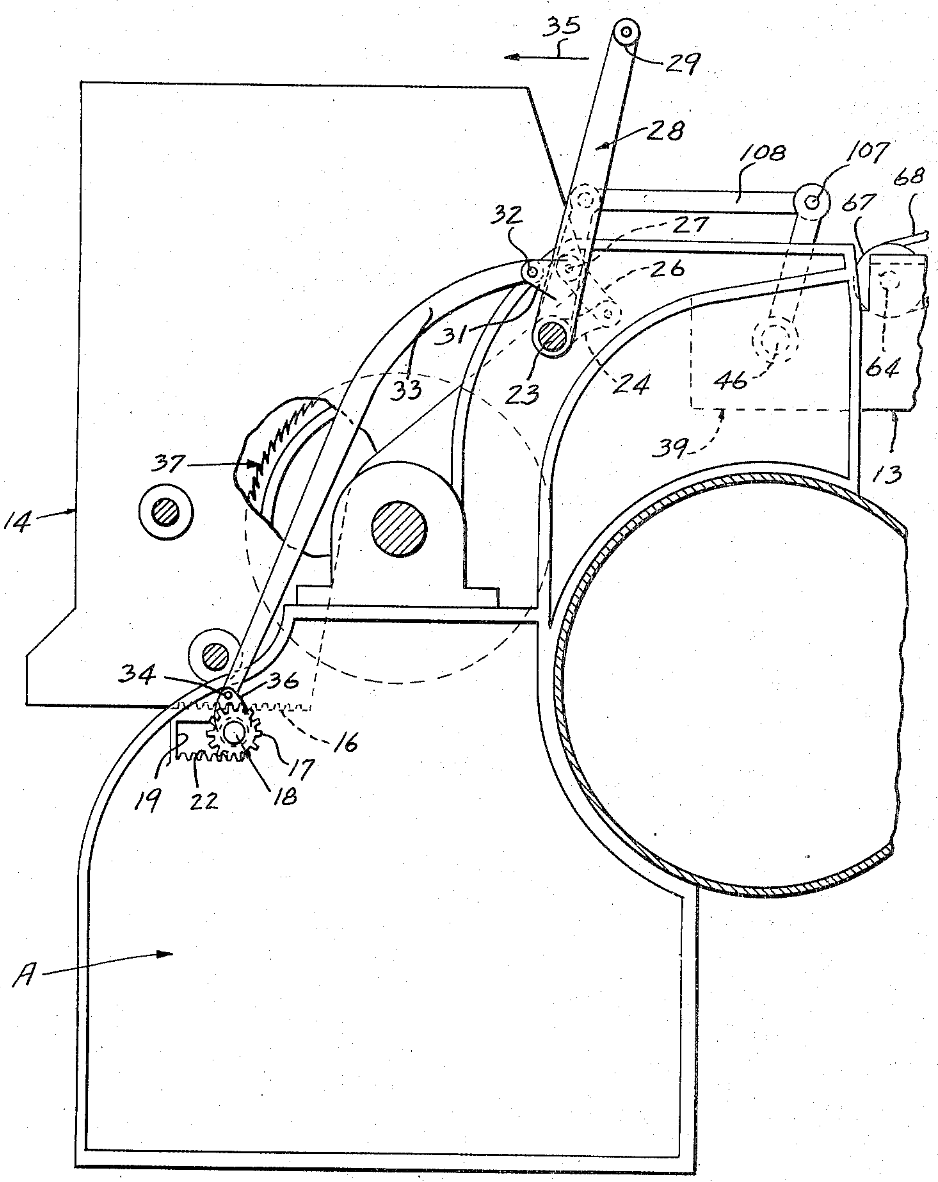
Fig. 3 is an end elevational view, partly in section, of the gin shown in Fig. 2 and taken generally along line III—III of Fig. 2.

From the mechanism so far described it will be apparent that when the handle 29 is rocked in the direction of the arrow 35 arm 24 and link 26 will move the upper end of the breast laterally to the left as viewed in Fig. 3 and Fig. 6. Simultaneously, through the connection of link 33, shaft 18 is rotated, moving the lower end of the breast laterally, to the left as viewed in Fig. 3. This motion therefore moves the gin breast as a whole laterally out of ginning position relative to the saw cylinder 37. The mechanism so far described is old in the art and represents merely one form of movable gin breast structure with which our invention is adapted for association.

Our improved power driven mechanism for moving the breast comprises a frame formed of end plates 38 and 39 which may be joined across the top adjacent the rear edges by a cross plate 41. Depending from the rear edge of the plate 41 is a plate 43, all of the plates being welded or otherwise suitably secured together to form a generally open framework. The frame just described may be made fast to the gin in any suitable manner as by supporting the same on a transverse channel member 44 forming a part of the gin structure. The mechanism 13 now being described may be located in any suitable place but preferably is located so that power may be supplied to the same from other parts of the gin or feeder mechanism usually used therewith and close enough to the shaft 23 that the mechanism may be operatively connected thereto.

Mounted in suitable bearings in the frame end plates 38 and 39 is a shaft 46. Loosely surrounding the shaft are inwardly facing bevel gears 47 and 48 having outwardly extending bosses 49 and 51, respectively. The gears 47 and 48 are held axially apart by means of a bushing 52. The bushing 52 is provided with a bore 53 disposed at right angles to the shaft 46. Rotatably mounted in the bore 53 is one end of a countershaft 54. The opposite end of shaft 54 is supported in a bearing 56 mounted on the rear plate 43 of the framework. Secured to the countershaft 54 as by a key 57 is a bevel gear 58 in mesh with the bevel gears 47 and 48. Secured to the shaft 54 by means of a set screw 59 is a worm gear 61.

Mounted in bearings 62 and 63 depending from the top frame plate 41 is a drive shaft 64. Secured to the inner end of the drive shaft 64 and meshing with the gear 61 is a worm 66. Mounted on the outer end of the shaft 64 is a pulley 67 which may be driven by means of a belt 68 from any suitable source of power, not shown.

Figure 4:
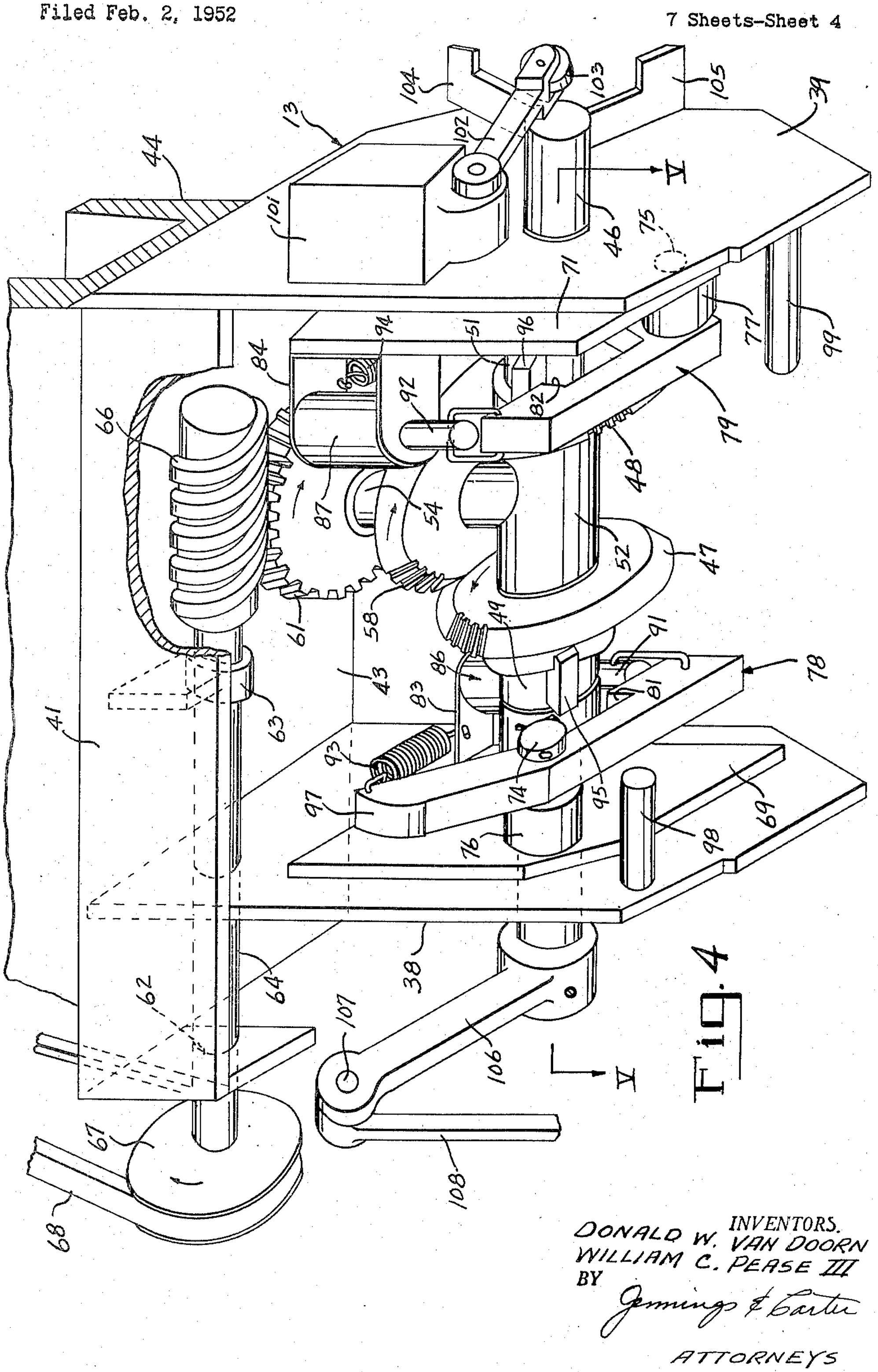
Fig. 4 is a perspective view of our improved gin breast operating mechanism, partly broken away and in section.
Figures 5, 7:
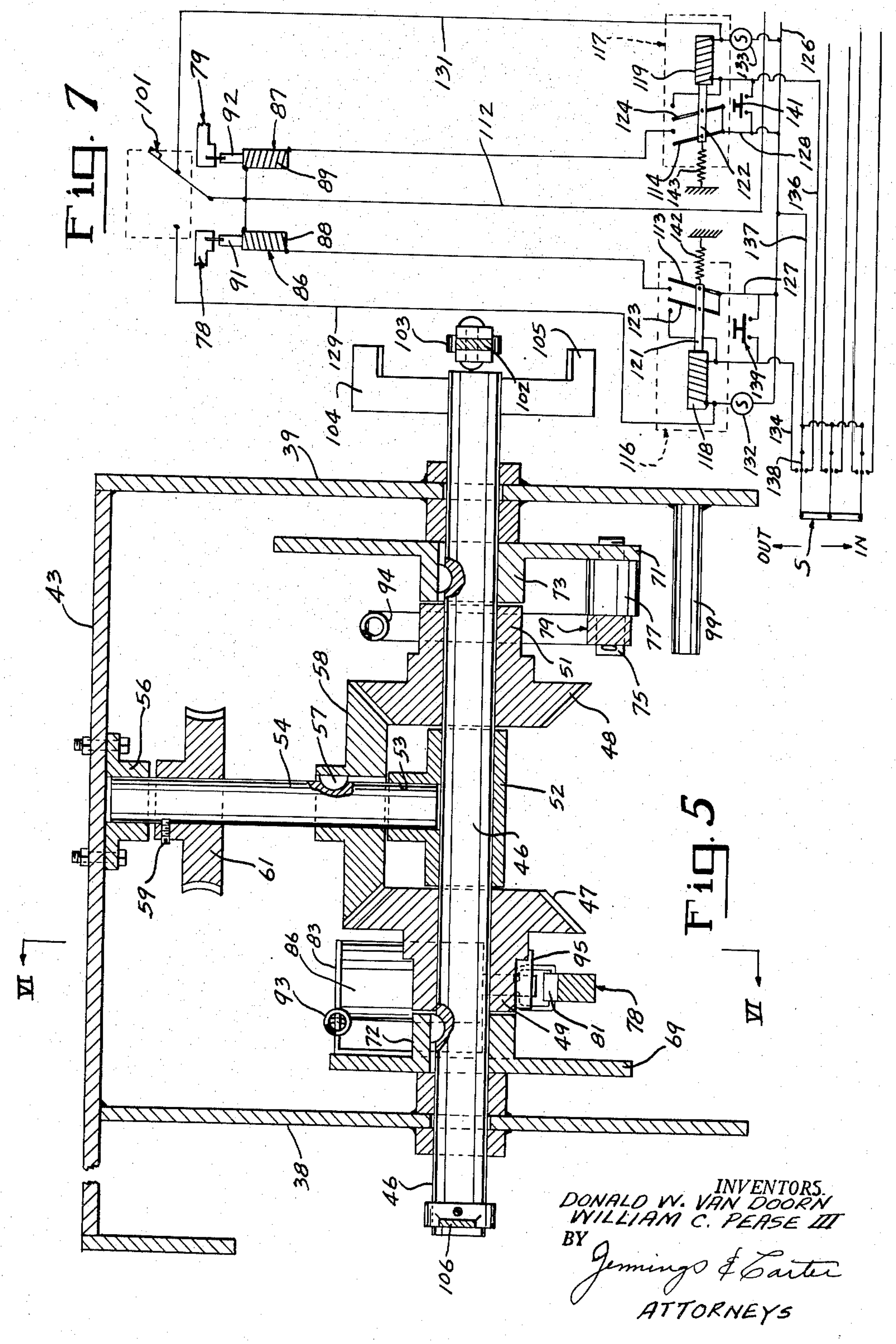
Fig. 5 is a detail sectional view taken generally along line V—V of Fig. 4.
Fig. 7 is a wholly diagrammatic wiring diagram.

Referring more particularly to Figs. 4 and 5, surrounding the shaft 46 are plates 69 and 71. The plates are provided with bosses 72 and 73 which are keyed to the shaft 46. Mounted on inwardly extending pins 74 and 75 and held spaced from the plates 69 and 71 by means of washers 76 and 77 are dogs indicated generally by the numerals 78 and 79. The dogs 78 and 79 are provided with seats 81 and 82, the seats being formed by providing a square shoulder on the dogs as illustrated in the drawings.

Secured to the inner sides of the plates 69 and 71 and extending inwardly therefrom are brackets 83 and 84. Mounted in the brackets are solenoids 86 and 87 having coils 88 and 89, respectively, and armatures 91 and 92, respectively. As best shown in Fig. 6, the dogs 78 and 79 have angularly disposed portions so that the arms overhang the shaft 46. In the end of the dogs 78 and 79 are anchored springs 93 and 94, respectively, the ends of which are anchored to the brackets 83 and 84 as illustrated. Each of the solenoids 86 and 87 may be provided with an internal stop, not shown, associated with the armature thereof to prevent the springs 93 and 94 from pulling the armatures completely out of the coils.

Mounted on the bosses, 49 and 51 of the gears 47 and 48 are lugs 95 and 96, respectively. The lugs are of a size to engage against the seats 81 and 82 of the dogs 78 and 79, removably locking the plate 69 and mechanism carried thereby for rotation with the gears 47 and 48 as will later appear. The upper end of dog 78 is rounded as indicated at 97 and the lower end of dog 79 is similarly rounded. It will be understood that the dogs 78 and 79 are duplicates with respect to configuration, the same being disposed oppositely in the sense that shoulder 81 of the dog 78 is below the pivot point afforded by its pin 74. Projecting inwardly from the plates 38 and 39 are pins 98 and 99. The pins 98 and 99 are so located that the curved ends 97 of the respective dogs 78 and 79 engage the same after predetermined rotation of the dogs, thereby to pivot the dogs on their pins, disengaging the shoulders from the lugs.

On the outer surface of plate 39 we provide a toggle or snap switch 101. The switch 101 can be defined as a double throw switch without neutral position. The switch may have an actuating arm 102 together with a roller 103 in the lower end thereof. Secured to the projecting end of the shaft 46 and straddling the roller 103 on the arm 102 are brackets 104 and 105. The brackets are disposed to rock the switch arm from side to side, thereby to throw the switch as also will be later explained.

On the opposite end of shaft 46 we secure an arm 106. Pivotally connected to the arm 106 as at 107 is a link 108 which is pivoted at its other end at 109 to another arm 111 fast on the breast operating shaft 23.

In Figs. 1 and 7 we show diagrammatically the control switches and circuits for our improved apparatus. One power line 112 is connected to the central connection of the toggle switch 101 and to one side of the coils 88 and 89 of the solenoids 86 and 87. The solenoids 86 and 87 are energized by means of contact arms 113 and 114 which are part of relays indicated generally by the numerals 116 and 117 and which relays also embody coils 118 and 119, respectively. In the manner understood, the contact arms 113 and 114 are carried by the armatures 121 and 122 of the respective relays 116 and 117. The relays also have contact arms 123 and 124 together with suitable circuits effective to provide holding circuits for the coils 118 and 119 thereof. Power from the other power supply line 126 is supplied to the arms 113—123 and 114—124 through leads 127 and 128, respectively. The stationary contacts of the switch 101 are connected to the power supply line 126 through leads 129 and 131, respectively. Included in the circuits 129 and 131 are signal lamps 132 and 133, respectively.

The master switch S is provided with a pair of contacts for each gin stand in the system. As shown in Fig. 7, a line 134 is connected to the uppermost one of the stationary contacts of a set and leads to one side of the coil 118. A connection 136 leads from the lowermost stationary contact of the set of points under consideration to one side of the coil 119. The power supply line 126 is connected through a branch lead 137 to the switch blade 138 controlling the set of contacts for the switch S.

In circuit across the leads 134—127 and 128—136 are normally open push button switches 139 and 141, respectively. It will be apparent that when the push buttons are momentarily closed the associated coil 118 or 119 is energized if arm 102 of toggle switch 101 is in the proper position to complete the electrical circuit thereby moving the respective armature 121 or 122 against the force of springs 142 or 143, as the case may be, closing the arms carried thereby against the respective contact points, completing the circuits as illustrated. Once the holding circuit is closed it will also be apparent that the solenoid 86 or 87 remains energized until the toggle switch 101 is thrown to the opposite position.

Figures 8, 9, 10, 11:
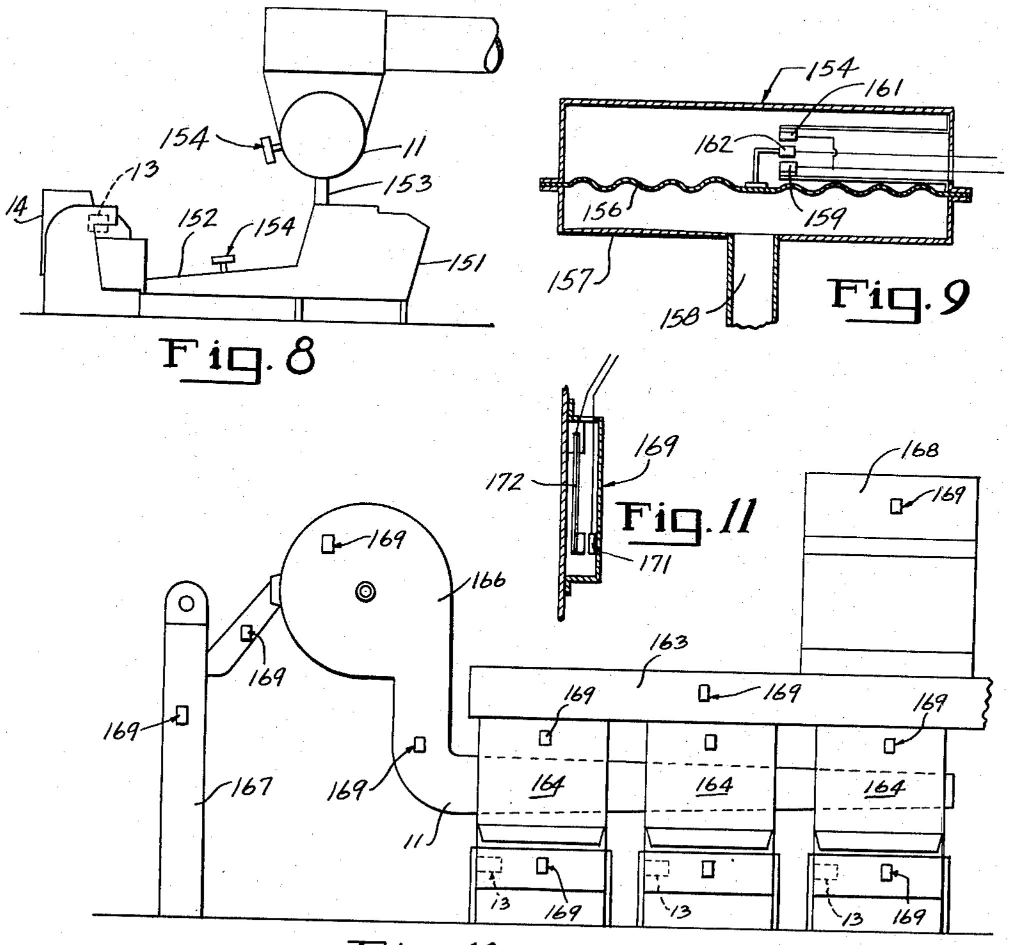
Fig. 8 is a diagrammatic end elevational view of a gin showing a pneumatic cotton cleaner behind the same and having associated therewith a pressure switch which may be used to control the gin breast mechanism.
Fig. 9 is a sectional view through a form of switch suitable for use with the system shown in Fig. 8.
Fig. 10 is a diagrammatic front elevational view of a gin system and illustrating in diagrammatic manner some of the places at which a heat responsive switch may be installed.
Fig. 11 is a sectional view of a suitable form of heat responsive switch for use in the gin system shown in Fig. 10.

Referring now more particularly to Figs. 8 and 9 of the drawings we show in diagrammatic manner an end elevation of a gin system in which there is associated with the gin stands a pneumatic lint cleaner 151. Instead of lint being delivered directly to the flue 11 through the lateral duct 10, it is delivered to the apparatus 151 through a duct 152. It will be understood that each gin of the system is provided with one of the cleaners 151 and that the lint passes from the machine 151 through a flue 153 into the main flue 11.

At 154 we show a pressure actuated switch which has a diaphragm 156 enclosed in a housing 157. On one side the diaphragm is in communication with the inside of the flue 152 through a pipe 158. The switch carries stationary contact points 159 and 161 and a movable contact point 162. It will be apparent that switch 154, through suitable circuits, not shown, may be wired so as to control the gin breast operating mechanism of the gin with which the machine 151 is associated, either in combination with the master switch S or in combination with the individual gin breast switch. Further, the switch 154 may be placed in the lint flue 11 and may be used in that position alone or wired in parallel with the switch 154 in the flue 152. In either event it will be apparent that if for any reason the pressure, either positive or negative, in the flues 152 or 11 varies more than a predetermined amount as determined by the setting of either switch 154, the switch closes, actuating the breast mechanism and stopping the flow of lint.

In Figs. 10 and 11 we show a multiple stand gin system and overhead feeder 163 which feeds individual extractor feeders 164 which in turn deliver the seed cotton to the individual gins. The lint flue 11 leads to the condenser 166 and from the condenser the lint cotton passes to a tramper or bale forming mechanism 167. The system may also be provided with an overhead drier and cleaner indicated at 168.

In order that the flow of seed cotton or lint may be stopped in the event of a fire in any part of the system we may install therein, in any of the places indicated, a fire responsive switch indicated generally by the numeral 169. As will be understood, the switch 169 may comprise a stationary contact 171 and a bi-metallic movable contact element 172. Through suitable circuits, not shown, any one of the switches 169 may be connected to throw out the breasts of all the gins in the system by actuating the automatic gin breast mechanism thereof. In view of the fact that such circuits will be apparent to those skilled in the art it is not believed necessary to illustrate the same.

Figure 13:
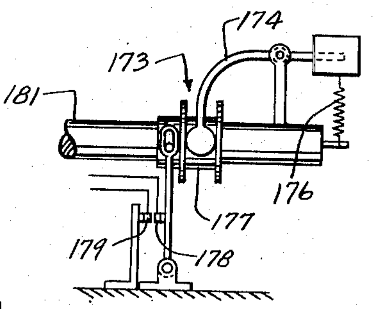
Fig. 13 is an enlarged fragmental view of a form of centrifugal switch which may be employed as shown in Fig. 12.
Figure 12:
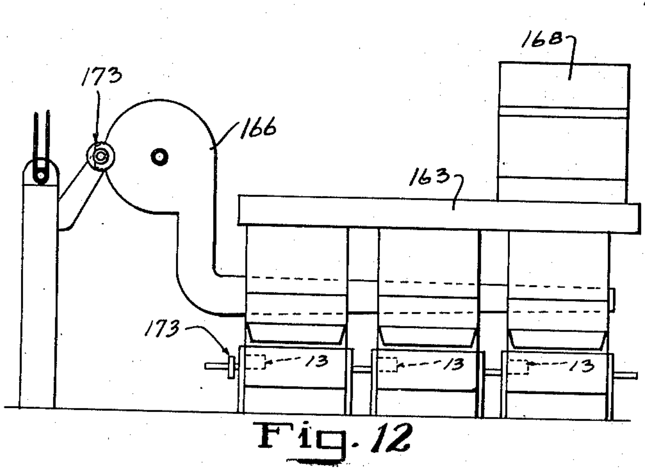
Fig. 12 is a view corresponding to Fig. 10 and showing in wholly diagrammatic manner a gin system equipped with a centrifugal type switch which may be used to control the breast mechanism.

In Figs. 12 and 13 we show a centrifugal type of switch which may be employed on many of the rotating shafts of the several machines involved in the gin system in order to throw out either one or all of the breasts automatically in response to slowing down of the shafts such as when the power fails, when the gins are deliberately stopped or upon failure of chains, sprockets, belts or other drive means. The switch 173 may comprise a weighted arm 174 biased in the manner indicated by a spring 176. A sliding collar 177 actuates an arm carrying a contact point 178. The stationary contact 179 is disposed to be contacted by the point 178 when the shaft 181 with which the switch is associated rotates less than a predetermined speed.

The switch 173 may be placed in a number of different positions in the system such for instance as on the main saw shaft of the gin, certain rotating shafts of the condenser, on the feed roll shaft of a saw type lint cleaner (not shown), or in any other place where a rotating shaft is available for the reception of such a device. Upon failure of the power or if for any other reason the shaft with which the switch is associated ceases to rotate or slows down, the switch closes, actuating the gin breast mechanism of the individual gin, or some or all of the same through suitable circuits, not shown.

Figure 14:
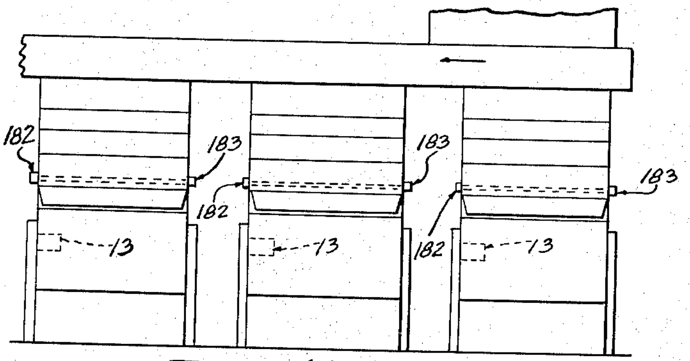
Fig. 14 is a front elevational view of a plurality of gins showing in diagrammatic manner the association with the feeder thereof an electric eye signal system which may be used to control the gin breast operating mechanism.
Figure 15:
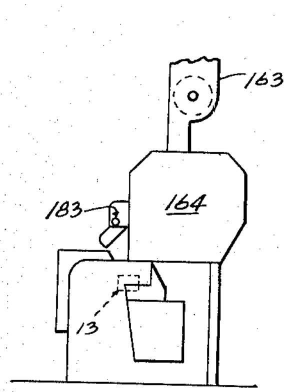
Fig. 15 is an end elevational view of the mechanism shown in Fig. 14.

In Figs. 14 and 15 we show an electric eye mechanism which may be placed adjacent the feed apron of the extractor feeders 164. In the manner well understood the electric eye mechanism embodies a photo-electric cell unit indicated generally by the numeral 182 and an exciter unit 183 which is adapted to direct a beam of light against the photo-cell in the unit 182. The units 182 and 183 are spaced apart so that the beam of light is interrupted whenever cotton is flowing in proper manner through the feeder. When for some reason seed cotton creases to flow, a switch, not shown, actuated by the unit 182 cloess, actuating the gin breast.

Figure 16:
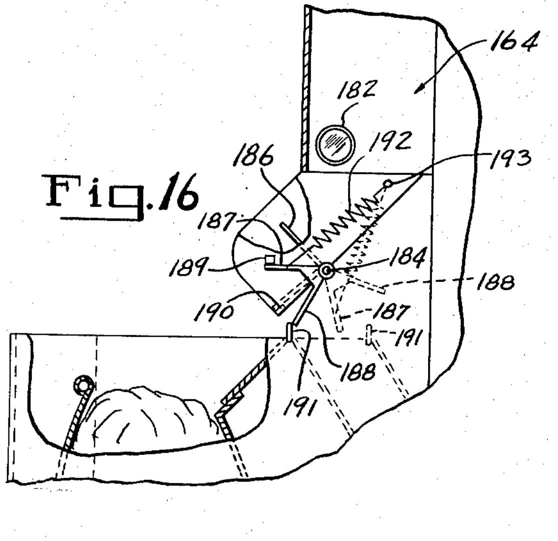
Fig. 16 is an enlarged transverse sectional view showing an automatic seed cotton valve associated with the discharge trough of the feeder which may be placed on the feeders of systems embodying our improved gin breast operating mechanism.

In Fig. 16 we show a automatic valve for stopping the flow of seed cotton into the gins whenever the gin breasts are opened and for permitting the flow of seed cotton thereinto when the breasts are closed. This mechanism comprises a shaft 184 pivotally mounted adjacent the apron or slide of the extractor feeder 164 down which the seed cotton flows into the gin. Mounted rigidly on the shaft, inside the delivery trough of the extractor feeder is a plate valve 186. On one end of the shaft 184 is a V-shaped bracket having arms 187 and 188 which are adapted to contact respectively a stop 189 and stop 191 carried on the outer end of the apron of the extractor feeder and on the movable gin breast. A spring 192 has one end anchored to the arm 187 and the other end anchored at 193 to a suitable part of the framework of the apparatus.

It will be seen that when the gin breast moves outwardly to the full line position indicated in Fig. 16 the stop 191 has moved from the dotted line position to the position indicated in full lines. In its forward motion it has struck the arm 187 when it was in the dotted line position with the spring 192 lying on the right side of the shaft as viewed in Fig. 16 and moved it to a position where the arm 187 strikes the stop 189 on the end of the trough. When the gin breast is moved rearwardly the stop 191 moves rearwardly, rocking the shaft so that the valve 186 engages a stop 190 inside of and at the bottom of the trough. Thus, whenever the gin breast is moved outwardly the valve 186 automatically prevents further feeding of seed cotton into the gin and when the breast moves inwardly into ginning position the blade or vane 186 moves downwardly permitting seed cotton to feed into the gin.

The mechanism shown in Fig. 16 may be used with any gin embodying our improved breast operating mechanism and is useful in preventing overfeeding of cotton and prevents bridging over of the cotton on top of the roll within the gin when the breast is shown out.

Figure 17:
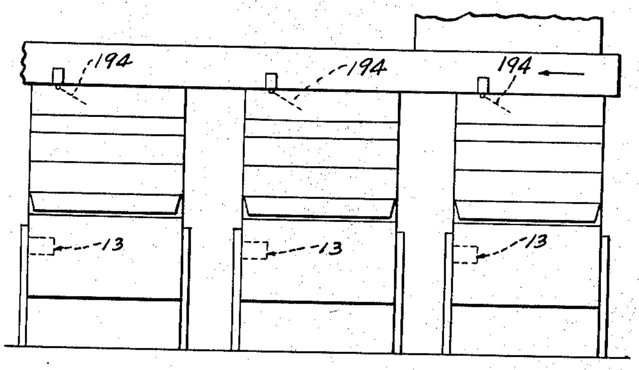
Fig. 17 is a diagrammatic front elevational view of a plurality of gins showing the same equipped with vane actuated switches located adjacent the distributor feeder of the system, which switches may be used to control the gin breast operating mechanism.
Figure 18:
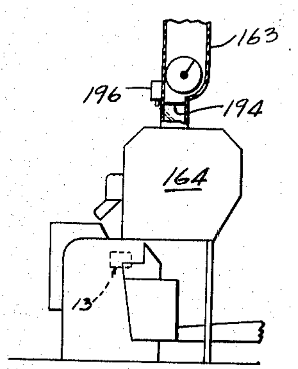
Fig. 18 is an end elevational view of the apparatus shown in Fig. 17.

In Figs. 17 and 18 we show still another form of switch which may be in the form of a spring biased vane 194 placed at the point where the distributor feeds cotton to the extractor feeders 164. The vane may have associated therewith a switch of the type shown at 196 in Fig. 19. This switch is spring biased toward closed position by means of a spring 197.

Further, in order to prevent "plating" of the bale and where there are more than 3 gin stands in a system we prefer that the switch 196, associated with the gin first to receive cotton, be so wired as to control the out movement of the breasts of the first three gins to receive cotton. At 196*a* we show a similar switch having a vane 194 for actuating the same and spring biased to open position which controls the in movement of the breasts of the first three gins. Thus, when cotton is flowing into the first gin switch 196 is held open against its spring 197. As soon as cotton commences to flow into the gin whose breast is controlled by switch 196*a*, said switch 196*a* closes, throwing in the breasts of the first three gins. As will be remembered, switch 101 is effective at all times to prevent shorting of the circuits in the event any of the switches close at the wrong time. It will be apparent that the wiring diagram shown in Fig. 19 is a fragmental view of the wiring diagram shown in Fig. 7 and that the switch mechanism now being described may be used either separately or in conjunction with both the push-buttons shown in Fig. 7 and the master switch S shown therein.

Figure 19:
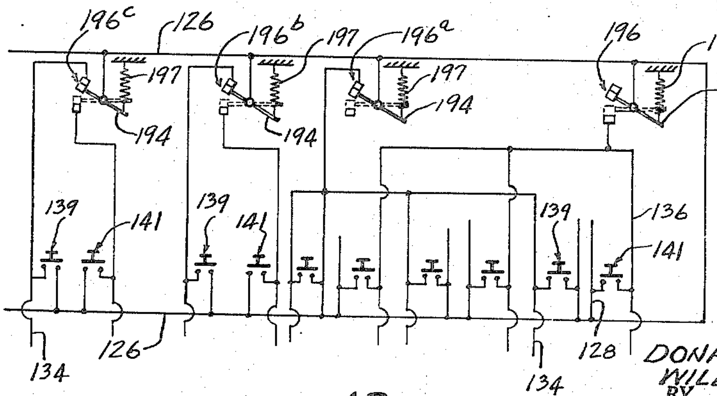
Fig. 19 is a fragmental, wholly diagrammatic wiring diagram which shows vane actuated switches included in the wiring diagram shown in Fig. 7 of the drawing in such manner that the first gin to which cotton is delivered controls the out motion of the gin breasts of the first three gin stands, while the in movement thereof is controlled by the switch associated with the third gin of the series.

The 4th and 5th gin stands of the system shown in Fig. 19 preferably are individually controlled by means of switches 196*b* and 196*c*. These switches are spring biased by the spring 197 to a position to energize the out moving mechanism of the gin breast operating means.

From what has been said with respect to Figs. 17, 18 and 19, it will be seen that when cotton is flowing in proper manner from the distributors to the extractor feeders all the switches 196 to 196*c*, inclusive, are in the position shown in full lines in Fig. 19 due to cotton engaging the vanes 194 thereof and overcoming the pull of the springs 197. In this position all of the gin stands of the system have their breasts in the in or operating position. As soon as the flow of cotton diminishes as for instance at the end of the ginning of a bale, the feeders associated with 4th and 5th gins, are the first to become empty, and switches 196*b* and 196*c* move to a position to energize the out mechanisms of their respective breast operating means. When the 1st feeder becomes empty switch 196 closes and through the circuits shown automatically opens the breast of the first three gins of the system. This prevents the gin stands from operating with an empty or loose roll which causes a delivery of low quality lint. The 1st, 2nd and 3rd gin breasts are moved to the "out" position simultaneously to cause the last cotton going to the bale to be supplied in large enough quantity to form a good bat thus improving the sample at the outer surface of the bale.

It is understood that the foregoing method of preventing plating of the bale which has been described in conjunction with the vane and switch arrangement of Figs. 17, 18 and 19 can also be used in conjunction with the electric eye shown in Figs. 14 and 15.

From the foregoing the method of construction and operation of our improved mechanism may now be explained and understood. With the apparatus assembled on the gins as illustrated in the drawings and with the links from shaft 46 connected to the gin breast operating mechanism shaft 23, power is supplied to rotate shaft 64 through the belt 68. This effects rotation of gears 47 and 48 carrying the lugs 95 and 96. If it be assumed that all of the gin breasts are open, the same may be closed individually by momentarily closing the push buttons 139 of each gin. This establishes circuits through the solenoids 86, energizing the same. The energization of solenoid 86 of each gin causes the associated dog 78 to be rocked toward shaft 46, with the shoulder 81 thereof in position to be engaged by the rotating lug 95. The rotation of lug 95 when seated on the seat 81 rocks the entire dog, solenoid and plate 69 and hence rotates shaft 46. This rotation continues until the rounded end 97 of the dog contacts the associated inwardly projecting pin 98 which serves to disengage the seat or shoulder 81 from the lug 95. By this time the link 108 will have pivoted the shaft 23 and through the downwardly extending link 33 will have rocked shaft 18, shifting the gin breast laterally. As soon as the breast reaches its inner desired position lug 105 on the end of the shaft 46 strikes roller 103 of switch 101, opening the same, de-energizing the relay solenoid 118, thereby de-energizing the solenoid 86.

If the breasts are all in outermost position and it is desired to move all of the breasts inwardly, simultaneously, master switch S is thrown to a position to energize the relay coils and hence all of the solenoids 86 simultaneously. Reversely, if the breasts are in and it is desired to throw them out this may be accomplished in the manner illustrated either by pressing the individual buttons 141 of each gin throwing the master switch to the opposite position, thereby energizing all of the solenoids 87 at the same time. It will be understood that the master switch S is connected to each of the gin stands in the manner illustrated in detail in Fig. 7 with respect to a single gin stand. It will be noted that switch 101 is effective to prevent energization of the inappropriate ones of the solenoids 86 or 87 even if their push button switches are closed or even if switch S is closed the wrong way.

It is to be noted that the input shaft 64 is continuously driven as are the gears 47 and 48 and hence the lugs 95 and 96 carried thereby. Through the medium of the solenoid actuated clutches we are enabled to provide means for moving the gin breast with a minimum amount of power since the driving portions of the clutches are up to full speed at the time the clutches are engaged. It will also be noted that our improved apparatus may be attached to the gin without disturbing the manually operable breast opening and closing handle exemplified by the lever 28 in the drawings.

When using our apparatus in association with the breasts of a multiple gin system it will be apparent that through actuation of the master switch S which controls the movement of all of the breasts, "plating" of the bale is eliminated. Likewise, the switch S may be located in any suitable place in the gin plant, or obviously, there may be more than one of the switches S located in different portions of the plant. Furthermore, our invention is adapted for use in connection with a master switch of the general type indicated at S and which is itself controlled in response to the presence of fire, choking of the gins or the like. Thus, our invention is suitable for use with fire detection switches located either in the main lint flue 11, the baling press, or in other positions in the system. When so used, the presence of fire anywhere in the system can be caused through suitable mechanisms, which will be apparent to those skilled in the art, to actuate the master switch S, thereby to stop all ginning quickly and automatically. It will be understood that the wires leading to the solenoids 86 and 87 are arranged so as to have sufficient slack therein to permit the solenoids to rock.

In connection with the automatic operation of the several gin breasts through the switch means disclosed in Figs. 8 to 19, inclusive, it will be apparent that each of the types of switches herein disclosed is particularly adapted for use for its stated purpose. Thus, if one wishes to protect a gin system against fire one can employ the switches 169. If the gin is equipped with a saw type lint cleaner one may wish to employ the centrifugal switches 173. On the other hand, if the gins are equipped with the pneumatic type of lint cleaner one may wish to employ the switch 154. Under certain conditions the electric eye and exciter mechanism 182 and 183 may be employed while under others the switches 196 and the vane 194 for actuating the same may be used.

By reference to Fig. 19 it will be seen that any of the other switches disclosed herein may be placed in the circuits shown in place of the switches 196 to **196*c***, inclusive. Further, the various switches may be wired to control only the individual gin stand with which they are associated or, if desired, each switch may be wired in parallel with every other switch so that all of the gin breasts are thrown either in or out in response to given conditions existing in the system. We have thus shown switches which are capable of actuating either one, some, or all of the gin breast mechanisms in response to variations in speed, pressure, temperature and flow of cotton, and the latter by physical impact of the cotton on a switch arm or by the interruption of a light beam. Suffice it to say that from what has been described it will be apparent that we have shown and described a system in which our automatic breast actuating mechanism is capable of actuation in a great variety of ways dependent upon various conditions existing in the gin system. Obviously, one may wish to equip the gin system with one or more of the switches of different types shown herein so that the breasts are automatically moved out for any one or several of the reasons named.

In actual operation our invention has proven successful. It is simple of construction and reliable in operation and occupies a minimum amount of space. Further, the apparatus can readily be placed on existing gins with only minor changes in the framework thereof.

While we have shown our invention in several forms, it will be obvious to those skilled in the art that it is not so limited but is susceptible of various changes and modifications without departing from the spirit thereof, and we desire, therefore, that only such limitations shall be placed thereupon as are specifically set forth in the appended claims.

What we claim is:

1. The combination with a ginning system embodying a plurality of gins each having a breast mounted for movement into and out of ginning position, or power driven clutch mechanisms operatively associated with each gin each of which clutch mechanisms comprise continuously and oppositely rotating clutch elements, a shaft about which said elements rotate, means operatively connecting the shaft to the gin breast for moving the same into and out of ginning position, dogs operatively connected to the shaft and engageable with said clutch elements, electrical means operable when energized to engage the dogs with said clutch elements, and an electric switch and suitable circuits therefor common to the electrical means on all the gins effective to energize the same simultaneously and move the gin breasts into and out of ginning position selectively.

2. The combination with a ginning system embodying a plurality of gins each having a breast mounted for movement into and out of ginning position, of a pair of clutches on each gin having power driven members rotating in opposite directions, movable dogs associated with said driven members, solenoids operatively connected to said dogs, a shaft about which said driven members rotate, means mounting the dogs non-rotatably on said shaft, a connection between said shaft and the breast of the gin, electrical circuits within which are included a source of EMF and the solenoids connected to the ones of said dogs which are effective when engaged to produce rotation of the said shafts of the gins in a common direction, other electrical circuits within which are included a source of EMF and the other solenoids, and switch means for selectively closing said circuits, thereby to energize selected ones of said solenoids and open or close the breasts of all the gins simultaneously.

3. The combination with a ginning system embodying a plurality of gins each having a breast mounted for movement into and out of ginning position, of an oscillatable shaft on each gin, means operatively connecting said shaft to the breast of the gin, continuously driven oppositely moving clutch elements rotating about said shaft, members secured to the shaft adjacent the clutch elements, pivotally mounted dogs on said members disposed to engage the clutch elements and oscillate the shaft thereby to open and close the gin breast, solenoids operatively connected to the dogs effective when energized to engage the dogs with their associated clutch elements and oscillate the shaft, stationary means engageable with the dogs to disengage them from the clutch elements after pre-determined oscillation of said shaft, electrical circuits within which are included a source of EMF and those solenoids of each gin which are connected to produce oscillation of the said shafts of the gins in the direction to move the breasts out of ginning position, other circuits within which are included a source of EMF and the other solenoids of the gins, and switch means for selectively closing said circuits thereby to move the gin breasts into or out of ginning position substantially simultaneously.

4. In power driven mechanism for opening and closing the breast of a gin, an oscillatable shaft, linkage operatively connecting the shaft to the gin breast for opening and closing the same, a power supply shaft, clutch elements journalled on the oscillatable shaft, drive connections between the power supply shaft and said clutch elements rotating the same in opposite directions, a dog for each clutch element, means mounting the dogs for rotation with the oscillatable shaft and for pivotal movement into engagement with the clutch elements, a solenoid for each dog having the armature thereof connected to the dog and adapted when energized to engage the dogs with the associated clutch element, stationary members engageable by the dogs upon pre-determined rotation of the oscillatable shaft to disengage the dogs from the clutch elements, and means to energize the solenoids selectively.

5. Apparatus as defined in claim 4 in which the solenoids are in circuit with a limit switch, and in which there is provided means effective upon pre-determined rotation of the oscillatable shaft to open said switch.

6. Apparatus as defined in claim 4 in which said solenoids are in circuit with a double throw electric switch without neutral position, means effective upon pre-determined rotation of the oscillatable shaft to throw said switch from the position energizing the one of said solenoids then producing rotation of the oscillatable shaft to the position readying the other solenoid for energization, and other switch means in circuit with said solenoids and double throw switch effective when closed to energize the one of said solenoids readied by the closing of said double throw switch.

7. In power driven apparatus for opening and closing a gin breast, an oscillatable shaft, means operatively connecting the shaft to the gin breast whereby the breast opens when the shaft rotates in one direction and closes when the shaft rotates in the opposite direction, a pair of clutches embodying continuously driven elements rotating in opposite directions about the shaft, engageable means associated with each clutch element for locking the elements in driving relation to the shaft, solenoids operatively connected to the engageable means and effective when energized to engage the same with the associated clutch element, suitable circuits within which are included a source of EMF and the solenoids, and switch means in each of the circuits for selectively energizing the solenoids thereby to open or close the breast.

8. Apparatus as defined in claim 7 in which means is included in said circuits rendering ineffective the closing of the inappropriate one of said switch means as determined by the in or out position of the gin breast.

9. Apparatus as defined in claim 7 in which the means rendering ineffective the closing of the inappropriate one of said switch means is a double throw electric switch without neutral position, said switch being included in said circuits and mounted for its contacts to be closed alternately upon rotation of the oscillatable shaft.

10. In apparatus for opening and closing the breast of a cotton gin, a housing, a continuously rotating driving shaft journalled in the housing, a second shaft mounted for oscillation in the housing, linkage connecting the second shaft to the gin breast whereby the breast opens responsive to oscillation of the second shaft in one direction and closes responsive to oscillation thereof in the other direction, a pair of spaced apart inwardly facing beveled gears mounted for rotation on the second shaft, a third bevel gear in mesh with said pair of gears, means supporting the third gear for rotation, means operatively connecting the third gear in driving relation to the driving shaft, clutch elements driven by each of the pair of gears, a pivoted dog for each clutch element operatively mounted for rotation with the second shaft, a solenoid for each dog having an armature connected to the dog and effective when energized to engage the dog with the associated clutch element and lock the second shaft in driving relation to said clutch element, stationary means mounted in the path of rotation of the dogs effective when engaged by the dogs to disengage the dogs from the clutch elements, and means to energize and de-energize the solenoids selectively.

11. The combination with a cotton ginning system embodying a gin having a movable breast together with a lint flue to which said gin delivers lint, of power driven breast operating mechanism adapted for connection to the gin breast and disposed when so connected to move the breast out of ginning position, electrically powered means disposed when energized operatively to connect said operating mechanism to the breast, and a normally ineffective electric switch in said lint flue operable upon an abnormal rise of temperature in the flue and thereby effective to energize said electrically powered means.

12. In a cotton ginning system embodying a gin stand having a breast movable from ginning to open position and wherein seed cotton enters the system through conduits, is ginned, and the lint cotton is delivered to a condenser through other conduits, the improvement comprising power driven mechanism engageable with the gin breast and disposed when engaged to open the breast, electrically powered means for engaging the power driven mechanism, switch means located in selected ones of said conduits and actuated in response to a selected abnormal condition of heat, pressure, and flow of seed cotton in said selected conduits, and circuits in which is included the switch means and effective when the switch means is actuated to energize the electrically powered means.

13. In a cotton ginning system embodying a gin of the kind having a breast movable from ginning to out position, and a conduit conveying seed cotton to the gin, the combination of power driven mechanism operatively engageable with the breast for moving it from ginning to out position, electrically driven control means effective when energized to engage the power driven mechanism with the breast, electric circuits connected to the control means, and switch means in said circuits associated with said conduit effective to energize the control means upon the presence of fire in said conduit, cessation of flow of cotton in said conduit, and change of pressure in said conduit, selectively.

14. In a cotton ginning system embodying a gin of the kind having a breast movable from ginning to out position, and a conduit conveying lint cotton therefrom, the combination of power driven mechanism operatively engageable with the breast for moving it from ginning to out position, electrically driven control means effective when energized to engage the power driven mechanism with the breast, electric circuits connected to the control means, and switch means in said circuits associated with said lint cotton conduit effective to energize the control means upon the presence of fire in said conduit and predetermined change of pressure in said conduit, selectively.

15. The combination with a cotton gin of the kind having a breast movable from ginning to out position together with a lint flue to which the gin delivers lint, of a pressure actuated electric switch having a contact movable upon a predetermined rise in pressure in the lint flue, electric circuits in which are included the switch and a source of E. M. F., and apparatus operatively associated with the gin breast including an electrically responsive control in said circuits effective upon movement of said contact of the switch to move the breast to out position.

16. The combination with a cotton gin of the kind having a breast movable from ginning to out position together with a lint flue to which the gin delivers lint, of a temperature responsive electric switch having a contact movable upon a predetermined rise in temperature in the lint flue, electric circuits in which are included the switch and a source of E. M. F., and means associated with the gin breast including an electrically responsive control in said circuits effective upon movement of said contact of the switch to move the breast to out position.

17. The combination with a cotton gin of the kind having a breast movable from ginning to out position together with a conduit to which the gin delivers lint, of switch means associated with the lint conduit and having a circuit controlling contact means movable upon the presence of fire in said conduit or change of pressure in said conduit, electric circuits in which are included the switch and a source of E. M. F., and electrically responsive means in said circuits with the switch means and associated with the gin breast effective upon movement of said switch contact to move the breast to out position.

18. Apparatus for processing seed cotton comprising in combination: a cotton gin, including a breast movable between active and inactive positions; a feed hopper through which raw cotton is supplied to the gin; sensing means to detect the presence of cotton in the feed hopper; and means controlled by said sensing means for automatically moving the breast to inactive position in response to the absence of cotton in the feed hopper and for moving the breast to active position in response to the presence of cotton in the feed hopper.

19. Apparatus for automatically processing seed cotton comprising in combination: a cotton gin including a breast movable between active and inactive positions; a feed hopper for supplying raw cotton to the gin; a biased baffle plate pivotally mounted in the feed hopper and extending at least partially across the interior of the hopper in a position to partially block the path of travel of cotton therethrough; and means responsive to pivotal movements of said baffle plate for moving the breast to active or inactive position.

20. The combination with a cotton gin of the type embodying a roll box and a saw cylinder operating therein to remove lint from a rotating roll of seed cotton in the roll box and including a breast movable between active and inactive positions, of a feed hopper through which seed cotton is supplied to the gin, sensing means associated with the feed hopper to detect the presence of seed cotton in said feed hopper, and means controlled by said sensing means and operable wholly independently of the rotation of said roll in the gin roll box for automatically moving the breast to inactive position in response to the absence of cotton in the feed hopper and for moving the breast to active position in response to the presence of cotton in the feed hopper.

References Cited in the file of this patent

UNITED STATES PATENTS

| | | |
|---|---|---|
| 738,370 | Stanley | Sept. 8, 1903 |
| 776,007 | Baker | Nov. 29, 1904 |
| 799,427 | Wilson | Sept. 12, 1905 |
| 1,163,946 | Murphy | Dec. 14, 1915 |
| 1,259,034 | Milam | Mar. 12, 1918 |
| 1,429,947 | Hooton | Sept. 26, 1922 |
| 2,086,809 | Kreis | July 13, 1937 |
| 2,090,543 | McClintock | Aug. 17, 1937 |
| 2,158,573 | Eastin | May 16, 1939 |
| 2,224,272 | Myers et al. | Dec. 10, 1940 |
| 2,454,424 | Baak | Nov. 23, 1948 |
| 2,655,695 | Ford | Oct. 20, 1953 |